Aug. 15, 1944.  H. E. FAY  2,356,041
SAFETY HOSE CLAMP
Filed June 7, 1943
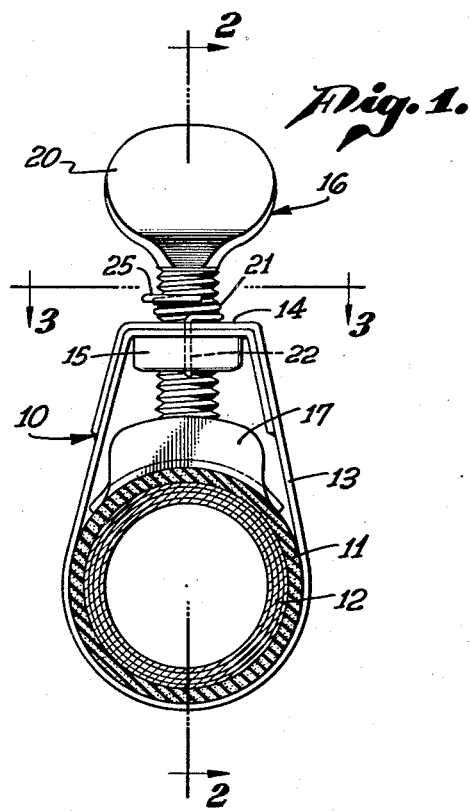
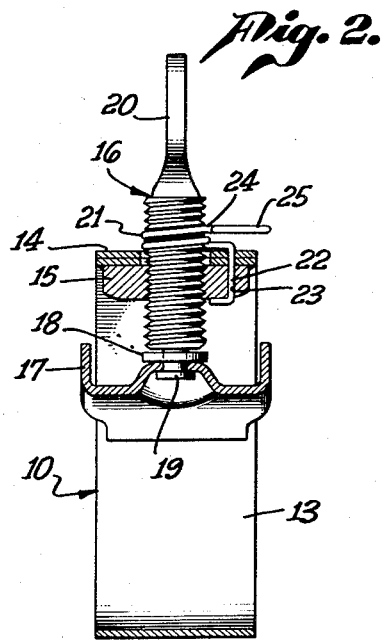
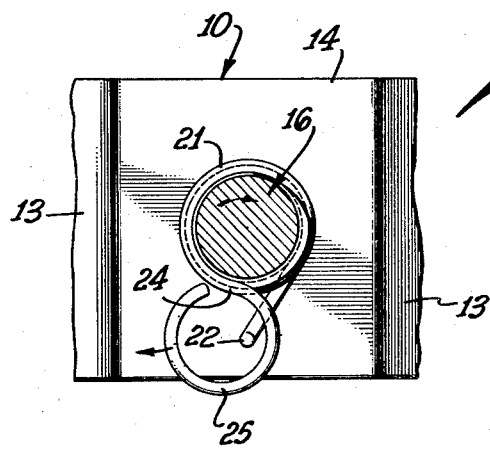
HOWARD E. FAY,
INVENTOR.
BY
ATTORNEY.

Patented Aug. 15, 1944

2,356,041

UNITED STATES PATENT OFFICE 2,356,041

SAFETY HOSE CLAMP

Howard Edward Fay, Tujunga, Calif.

Application June 7, 1943, Serial No. 489,940

2 Claims. (Cl. 24—19)

This invention relates to safety hose clamps, and the primary object of the invention is to provide a hose clamp which may be readily installed and tightened upon a hose and which will not become loosened by vibration or jarring but which can be readily manipulated for authorized loosening or removal of the clamp.

A further object of the invention is to provide in a device of the character described a frictional retaining means for the screw which is used to tighten the clamp, enabling the screw to be turned in as far as desired, and when the hose settles or if for any other reason it is desirable, enabling the screw to be further tightened, without any special manipulation, but which is adaptable to authorized removal of the screw without destroying, injuring or impairing the function of the friction retaining device.

My invention has particular utility in airplanes which utilize an exceptional number of hose clamps, as well as in automobiles, tanks, boats and other apparatus and equipment.

The present method of securing hose clamps against loosening by vibration is to utilize a hole drilled in the wing or head of the screw and wire this ring or head of the screw either to an adjacent wing or head of a screw on another clamp or to some stationary object (if available). Such practice requires the step of drilling the wing or head, utilizes unnecessarily a large quantity of copper wire, and moreover, each time the screw is removed or tightened, the wiring must be done over. In addition to this, unless the head of the screw lies in a particular plane with reference to the element to which the wire is to be attached the locking is not satisfactory because the screw may partially rotate and in doing so becomes partly loosened. On small clamps one turn of the screw after it is finger tight is usually too much, and the heads will not lie in a plane for wire locking. In addition to these problems, wire locking tends to hold the clamp or clamps rigid or restrained, cutting the hose. As it is never safe to back up on a hose clamp, the locking of same has presented a serious problem.

By my invention the screw is retained against unauthorized loosening or unscrewing irrespective of the rotational position of the screw.

The objects and advantages mentioned, and others, will become further apparent from a consideration of the disclosure.

In the drawing:

Figure 1 is a vertical end view of a hose clamp embodying my invention applied to a hose.

Figure 2 is a vertical sectional view of the same taken on the line 2—2 of Figure 1.

Figure 3 is a horizontal sectional view taken on the line 3—3 of Figure 1.

The hose clamp is designated generally by the reference numeral 10 and is shown applied to a hose 11 in the region of a reinforced core, pipe, or sleeve 12.

The clamp comprises a band 13 curved to embrace slightly more than the lower half of the hose, and tapering inwardly toward the top which is flat at 14 as shown.

Spot welded to the interior of the upper flat section 14 of the band is a nut 15 adapted to receive a screw 16. A threaded boss or thickened portion would serve the same purpose as the nut. The lower end of the screw is swiveled in a clamping segment 17, a portion of the screw being adapted to advance against a thrust washer 18 secured to the segment 17, and the extreme end of the screw being upset as at 19 to retain the segment in association with the screw when the screw is loosened.

The upper end of the screw is preferably formed with a flat head, wing or thumb piece 20.

A friction retaining device in the form of a coiled wire spring 21 is associated between the nut or threaded portion 15 and the threads of the screw 16. The convolutions of the coil spring have a pitch and internal diameter corresponding to the threaded bore of the nut, and form in effect a continuation thereof.

One end 22 of the spring is anchored in a hole 23 in the nut or otherwise secured thereto or to the section 14 by any other desired means. The opposite end 24 of the spring is free and terminates in a loop or extension 25. The spring is arranged so that the screw 16 first encounters the free end of the spring and in the relationship illustrated in the drawing will tend to expand the spring when the screw is rotated in a clockwise direction as shown by the arrow in Figure 3. This enables the screw to be turned in to whatever extent is desired. When a force is applied to rotate the screw in a counter-clockwise or left-hand direction the spring tends to wrap or contract upon the threads of the screw and to either retard or prevent such rotation, depending upon the tension and number of turns of the spring as well as the diameter of the screw.

My invention may be applied in two different ways: First, the tension of the spring, the number of turns, and diameter of the bolt or screw may be so related that while preventing a loosening of the screw from vibration or jarring the screw may be rotated for unscrewing when sufficient authorized force is applied to the head of the screw; or, secondly, the relationship of the forces and elements mentioned above may be such that the screw cannot be turned in a counter-clockwise or left-hand direction unless the spring is slightly expanded by manually pressing against the extension or loop 25 on the free end of the spring.

Whichever application is utilized, either a vibration of the device or a settling of the segment upon the hose or both will actually cause the screw to automatically tighten over a period of time as the frictional force exerted by the spring is in a clockwise direction.

I thus provide a hose clamp which will be retained upon the hose notwithstanding the presence of vibration or jarring and which will tend to tighten rather than loosen if there is any vibration or settling of the clamp, and which requires no wiring or special lock nuts to effect the desired safety feature, and which can nevertheless be removed by authorized action.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. For use in a hose clamp comprising a band and a segment cooperating therewith to engage the exterior of a hose: a female threaded element on said band beyond said segment, and a screw threaded through said element and advanceable against said segment to relatively contract said band and said segment, a friction retaining member comprising a wire spring having convolutions of a pitch and diameter corresponding to the threads of said element and effecting a continuation thereof, the advanced end of said spring being free and the opposite end of said spring being anchored to said element whereby said screw may be normally advanced but unauthorized unscrewing of the same as by vibration will be prevented, but permitting unscrewing by application of torque directly applied to said screw without injury to said friction member.

2. For use in a hose clamp comprising a band and a segment cooperating therewith to engage the exterior of a hose: a female threaded element on said band beyond said segment, and a screw threaded through said element and advanceable against said segment to relatively contract said band and said segment, a friction retaining member comprising a coil spring having convolutions of a pitch and diameter corresponding to the threads of said element and effecting a continuation thereof, the advanced end of said spring being free and the opposite end of said spring being anchored to said element whereby said screw may be normally advanced but unauthorized unscrewing of the same as by vibration will be prevented, said advanced end of said spring terminating in an extension adapted to be manually shifted for slightly expanding said spring to permit rotation of said screw for unscrewing same.

HOWARD EDWARD FAY.